(12) United States Patent
Tallo et al.

(10) Patent No.: US 6,412,055 B2
(45) Date of Patent: *Jun. 25, 2002

(54) METHOD AND APPARATUS FOR PRODUCT DEVELOPMENT

(75) Inventors: Kenneth Tallo; Kenneth D. Alton, both of Austin, TX (US)

(73) Assignee: Legerity, Inc., Austin, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 21 days.

(21) Appl. No.: 09/106,880

(22) Filed: Jun. 30, 1998

(51) Int. Cl.$^7$ ............................................... G06F 12/00
(52) U.S. Cl. ........................ 711/173; 711/103; 712/229; 712/39; 712/43
(58) Field of Search .............................. 711/173, 102, 711/103, 153; 712/229, 20, 39, 43

(56) References Cited

U.S. PATENT DOCUMENTS

| | | | | |
|---|---|---|---|---|
| 4,665,480 A | * | 5/1987 | Robert et al. ................ | 711/103 |
| 5,495,929 A | * | 3/1996 | Batalianets et al. ......... | 194/207 |
| 5,581,779 A | * | 12/1996 | Hall et al. .................... | 712/43 |
| 5,583,754 A | * | 12/1996 | Leonhardt et al. .......... | 364/132 |
| 5,682,310 A | * | 10/1997 | Pedneau et al. | |
| 5,809,264 A | * | 9/1998 | Ha .............................. | 710/130 |
| 5,826,093 A | * | 10/1998 | Assouad et al. ............. | 712/43 |

* cited by examiner

*Primary Examiner*—Matthew Kim
*Assistant Examiner*—Matt Anderson
(74) *Attorney, Agent, or Firm*—Williams, Morgan & Amerson

(57) ABSTRACT

A method and apparatus for allowing developers to develop software for their product. The method includes providing a first mode signal to a processor to operate in a development mode. The method also includes executing instructions stored in a first region of the memory in response to the first mode signal, providing data to the processor, and writing the data into a second region of the memory.

18 Claims, 6 Drawing Sheets

METHOD AND APPARATUS FOR PRODUCT DEVELOPMENT

BACKGROUND OF THE INVENTION

1. Field of the Invention

This invention relates generally to product development, and, more particularly, to a method and apparatus for developing products having programmable memories encoded with software to control the product.

2. Description of the Related Art

Increased competition in the technological field is driving many developers to produce new products at a much faster pace. While the new generation of products generally tends to offer more features, they also tend to be more complex in nature. To remain competitive in the high-tech industry, developers are increasingly confronted with the challenge of shortening their development turn-around time for more complex products, while preserving quality. To meet this challenge, developers are increasingly relying on product development tools to get high-quality products to the market in a timely fashion.

Modern, high-tech products are becoming more complex in nature, partly because of the growing popularity of integrated circuits and the ease with which they can be integrated into new products. Integrated circuits, which may include several processors and programmable memories, give developers flexibility in designing innovative solutions. A processor in an integrated circuit can utilize information stored in a memory (maskable ROM or RAM, for example) to perform several functions. It is, thus, common to find integrated circuits in products such as cordless phones and radios, which utilize these circuits to implement numerous features, ranging from key scanning to displaying information on screens. Those skilled in the art will appreciate that the code stored in the memory is what gives products such as cordless phones and radios their "personality."

The conventional method of developing and testing products that have a processor and maskable memory can be a slow and time-consuming process. For example, consider the steps involved in developing a cordless phone that utilizes a processor and a ROM that must be mask programmed. A developer must first write the code. Then, the code has to be placed in the ROM by a vendor capable of fabricating maskable memories. Next, the ROM is placed inside the cordless phone, where the code is then tested. If an error is discovered, then the entire process has to be repeated until the code is error free.

It is not unusual for developers to repeat the above process several times before the final product is introduced in the market. Each discovered error can consume a considerable amount of time because the ROM has to be removed from the product (e.g. cordless phone), reprogrammed, and then reinserted into the product for another test. This method is even more cumbersome and costly when the mask programmable ROM is integrated within the same die as the processor. Thus, what is needed is a method and apparatus that allows developers to evaluate new software (or firmware) for their product in a simple, efficient, and cost-effective manner.

The present invention is directed to overcoming, or at least reducing the effects of, one or more of the problems set forth above.

SUMMARY OF THE INVENTION

In one aspect of the present invention, a method is provided that includes providing a first mode signal to a processor to operate in a development mode. The method also includes executing instructions stored in a first region of the memory in response to the first mode signal, providing data to the processor, and writing the data into a second region of the memory.

In another aspect of the instant invention, an apparatus is provided that includes a memory having a first region containing executable instructions. The apparatus also includes a processor adapted to receive a first mode signal. The processor is capable of executing the executable instructions from the first region of the memory to operate in a development mode in response to receiving the first mode signal.

BRIEF DESCRIPTION OF THE DRAWINGS

The invention may be best understood by reference to the following description taken in conjunction with the accompanying drawings, in which like reference numerals identify like elements, and in which.

Figure 1:
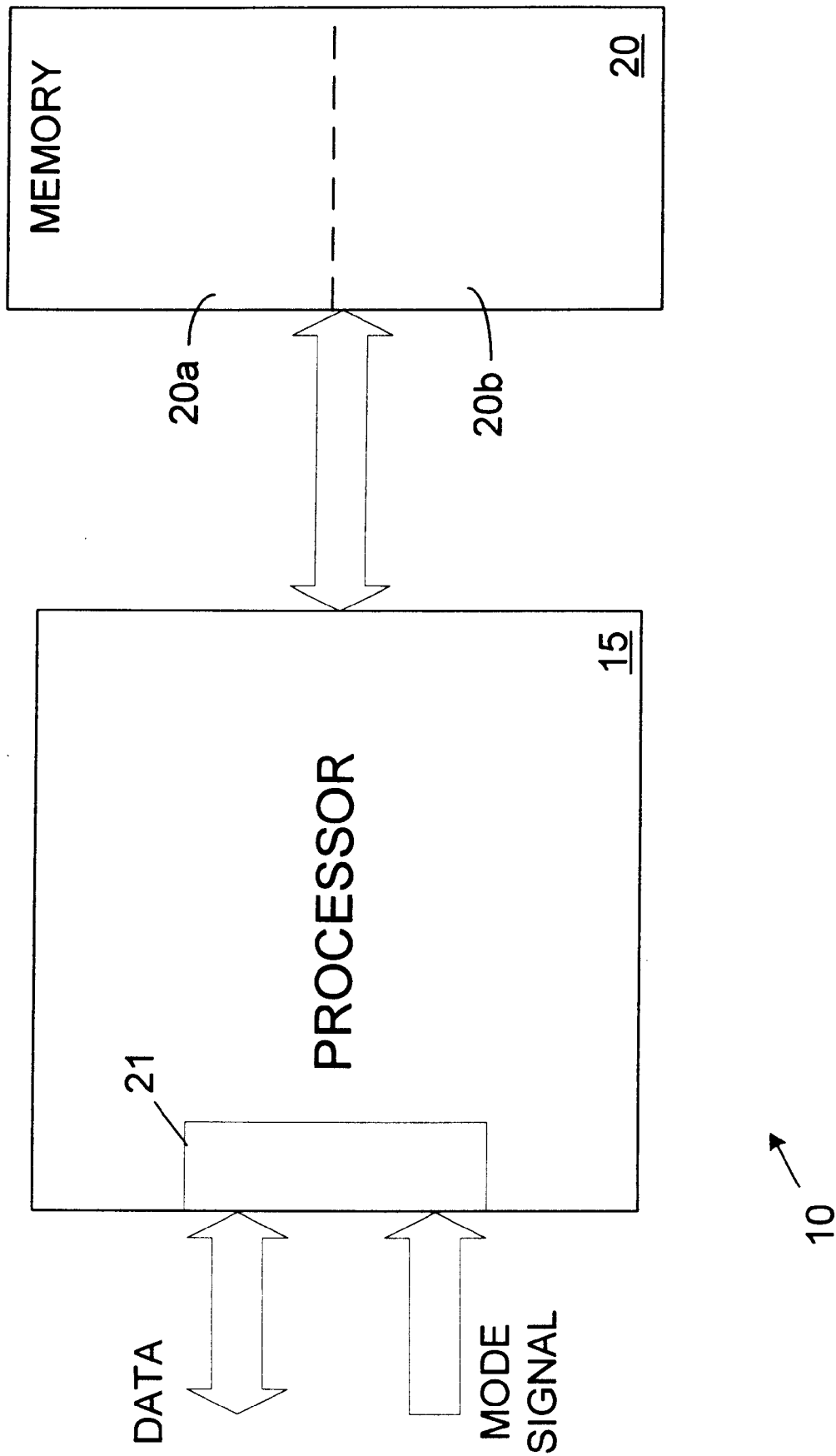
FIG. 1 illustrates a block diagram of an embodiment of an apparatus for the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
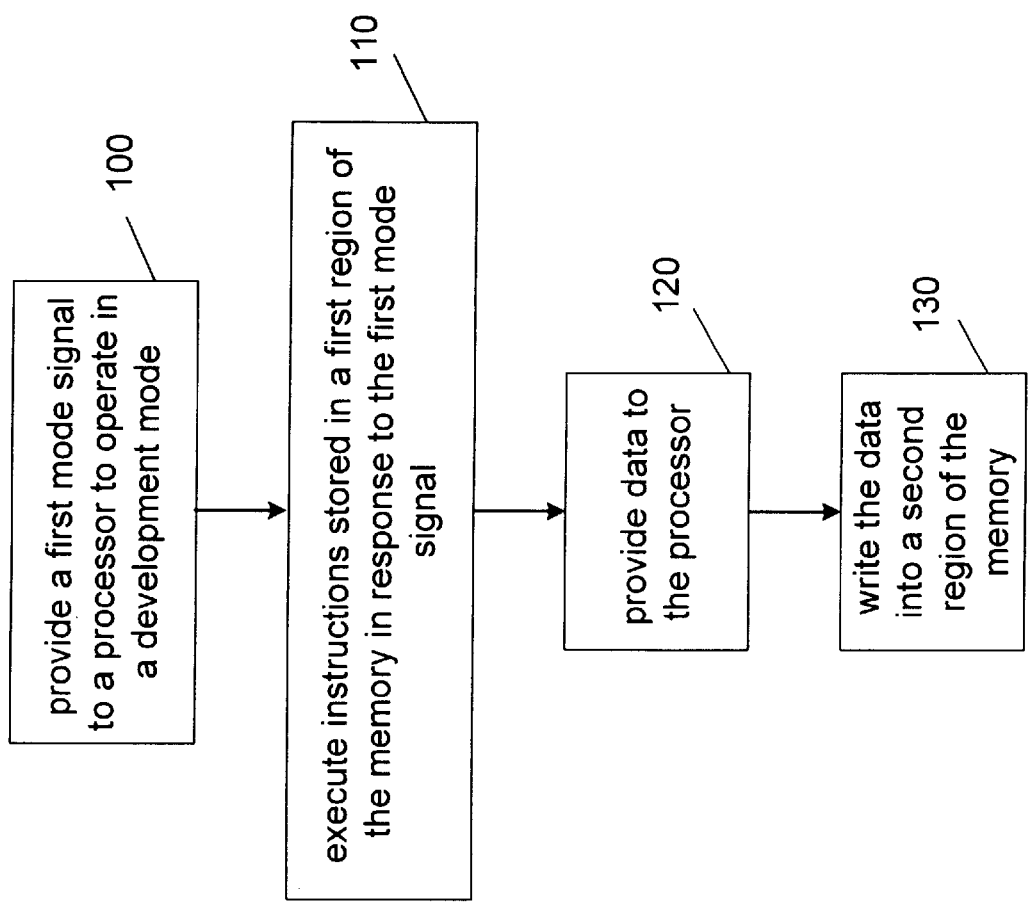
FIG. 2 depicts one embodiment of a method that can be employed by the apparatus of FIG. 1.

Referring now to FIGS. 1 and 2, FIG. 1 illustrates one embodiment of an apparatus of the present invention. The present invention facilitates the development of software (hereinafter referred to as "development software") stored in programmable memories of electronic products, where the software stored in such memories may control the functionality of the products.

By implementing the apparatus 10 in their products, developers can quickly and efficiently test new software by downloading the software to the apparatus 10 and executing it. The apparatus 10 has two operating modes, a development mode and an execution mode. The operating mode can be changed by a mode signal. In the development mode, a developer can first download the development software to the apparatus 10, and then test the development software in the execution mode. These two operating modes relieve developers of the time and expense of having to design and build two different hardware systems, one for developing or testing and the other for production. Accordingly, the present invention substantially reduces the need for purchasing other developing equipment, such as memory programmers, memory erasers, expensive integrated circuit clips, or emulator pods.

FIG. 1 illustrates a processor 15 and a memory 20 having a first and second region 20a, 20b. The processor 15 is capable of receiving and/or transmitting data, as well as capable of receiving a first and a second mode signal, from an external source (not shown). The processor 15 may be any processor or microcontroller known to the art. A particular embodiment may, for instance, employ an Intel® 8051 processor.

The external source (not shown) may be a data processing system, a dummy terminal, or any testing equipment capable of transmitting data. The external source may transmit commands or data to the processor 15. A "command" hereinafter is defined as a directive by an external source to the processor 15 to perform a particular function. One particular command, for example, may be to write data to the second region 20b of the memory 20, where the data to be written comprises the program instructions of the development software.

The data, commands, and the first and second mode signal may be provided to the processor 15 through its input/output interface 21, which, for example, may be a serial port, such as an RS232 interface. Specifically, the first and second mode signal may be transmitted to the processor 15 using a "program" pin of the RS232 interface. The "program" pin is set to a first known voltage level when the input/output interface 21 is connected to the RS232 interface, and to a second known voltage level when the input/output interface 21 is disconnected from the RS232 interface. Thus, the first mode signal can be transmitted to the processor 15 simply by connecting an external source to the input/output interface 21. Conversely, the second mode signal can be transmitted to the processor 15 by disconnecting the external source from the input/output interface 21.

The first and second regions 20a, 20b of the memory 20 may be pageable and may be organized in any suitable fashion known to the art, including in a contiguous or an interleaving manner. Furthermore, the memory 20 may be a random access memory (RAM), an EPROM, a flash, or other available programmable memories known in the art. The first region 20a of the memory 20 contains executable code (explained in more detail below) that directs the apparatus 10 to act like an intelligent slave. The second region 20b of the memory 20 is utilized to store the development software, which can later be tested during the execution mode.

FIG. 2 illustrates one embodiment of a method that can be employed by the apparatus 10 of FIG. 1. The method of FIG. 2 begins at block 100, where an external source (not shown) provides a first mode signal to the processor 15 to operate in a development mode of the apparatus 10. At block 110, in response to the first mode signal, the processor 15 executes the executable code that resides in the first region 20a of the memory 20, causing the apparatus 10 to act like an intelligent slave. As an intelligent slave, the apparatus 10 is capable of receiving data, as well as commands, from an external source. At block 120, the data, which comprises the program instructions for the development software, is provided to the processor 15. Next, at block 130, the data is written (e.g., programmed) into the second region 20b of the memory 20.

Figure 3:
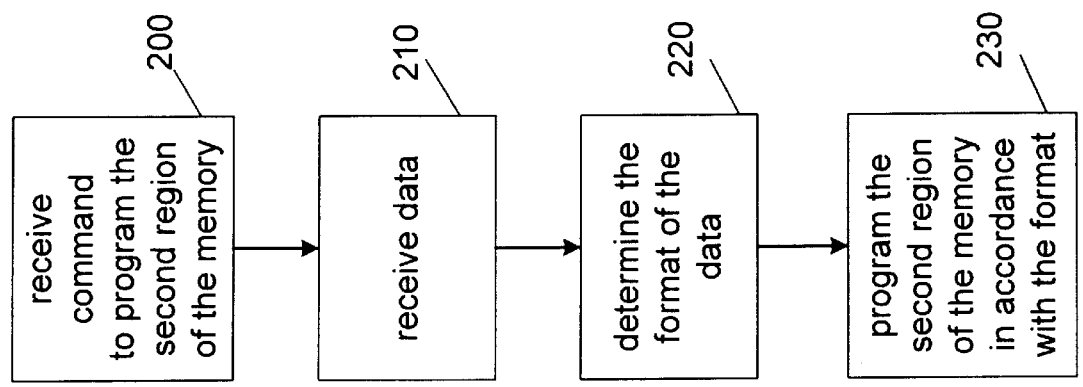
FIG. 3 depicts a flowchart illustrating the steps of executable code that is utilized in the method of FIG. 2.

FIG. 3 is a flowchart of the executable code stored in the first region 20a of the memory 20. As mentioned above, upon receiving the first mode signal, the apparatus 10 changes to the development mode, at which point the executable code stored in the first region 20a of the memory 20 is executed. In the development mode, the apparatus 10 acts like an intelligent slave and thus is capable of receiving and processing commands (or instructions) issued by an external source. At block 200, the apparatus 10, while acting as an intelligent slave, receives a command from an external source, directing it to perform a desired function, such as to write to the second region 20b of the memory 20. At block 210, in response to the command, the apparatus 10 receives the data. Next, at block 220, the intelligent slave determines the format of the data to be written in the second region 20b of the memory 20, and at block 230, it writes the data in accordance with the desired format.

Those skilled in the art will appreciate that the second region 20b of the memory 20 can be programmed with data in a variety of formats. Accordingly, the executable code residing in the first region 20a of the memory 20 can be programmed to write to the second region 20b of the memory 20 in any one of the known formats. For example, assuming that the memory 20 is a flash memory, one particular format that can be utilized for programming flash memory is the Intel® HEX-file format.

Figure 4:
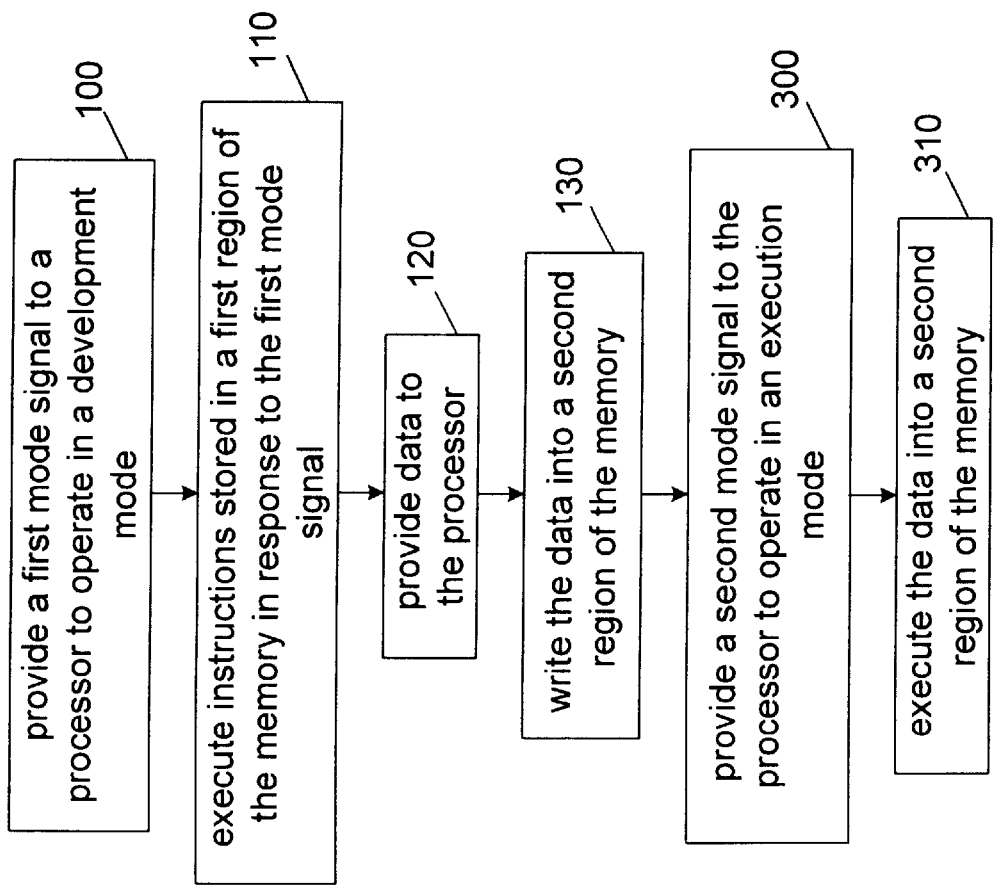
FIG. 4 illustrates a more specific embodiment of the method of FIG. 2 in accordance with the present invention.

FIG. 2 illustrates a method in accordance with the present invention that allows a developer to download the development software to the second region 20b of the memory 20 during the development mode. The method of FIG. 4 is a continuation of the method of FIG. 2, which allows a developer to execute the development software from the second region 20b of the memory 20 by changing the operating mode of the apparatus 10 to the execution mode. As can be seen, blocks 100, 110, 120 and 130 are identical to those illustrated in FIG. 2. At block 300, a second mode signal is provided to the processor 15 to operate in the execution mode of the apparatus 10. The second mode signal may be provided to the processor 15 by disconnecting the RS232 connection. At block 310, in response to the second mode signal, the processor 15 executes the downloaded software from the second region 20b of the memory 20.

In summary, the present invention offers a quick and efficient method of developing new software by allowing a developer to operate in two different operating modes—the development mode and the execution mode. The operating mode can be changed by a mode signal. In the development mode, the processor 15 executes the executable code stored in the first region 20a of the memory 20, which instructs the processor 15 to receive and download the development software to the second region 20b of the memory 20. Once the development software has been downloaded, the developer can switch to the execution mode and quickly test the software by executing it from the second region 20b of the memory 20.

In response to the first mode signal, the processor 15 executes instructions from the first region 20a of the memory 20, and in response to the second mode signal, the processor 15 executes from the second region 20b of the memory 20. It should be apparent to those skilled in the art that, using discrete logic, it is possible to direct the processor 15 to execute from different regions of the memory 20 in response to a mode signal.

Figure 5:
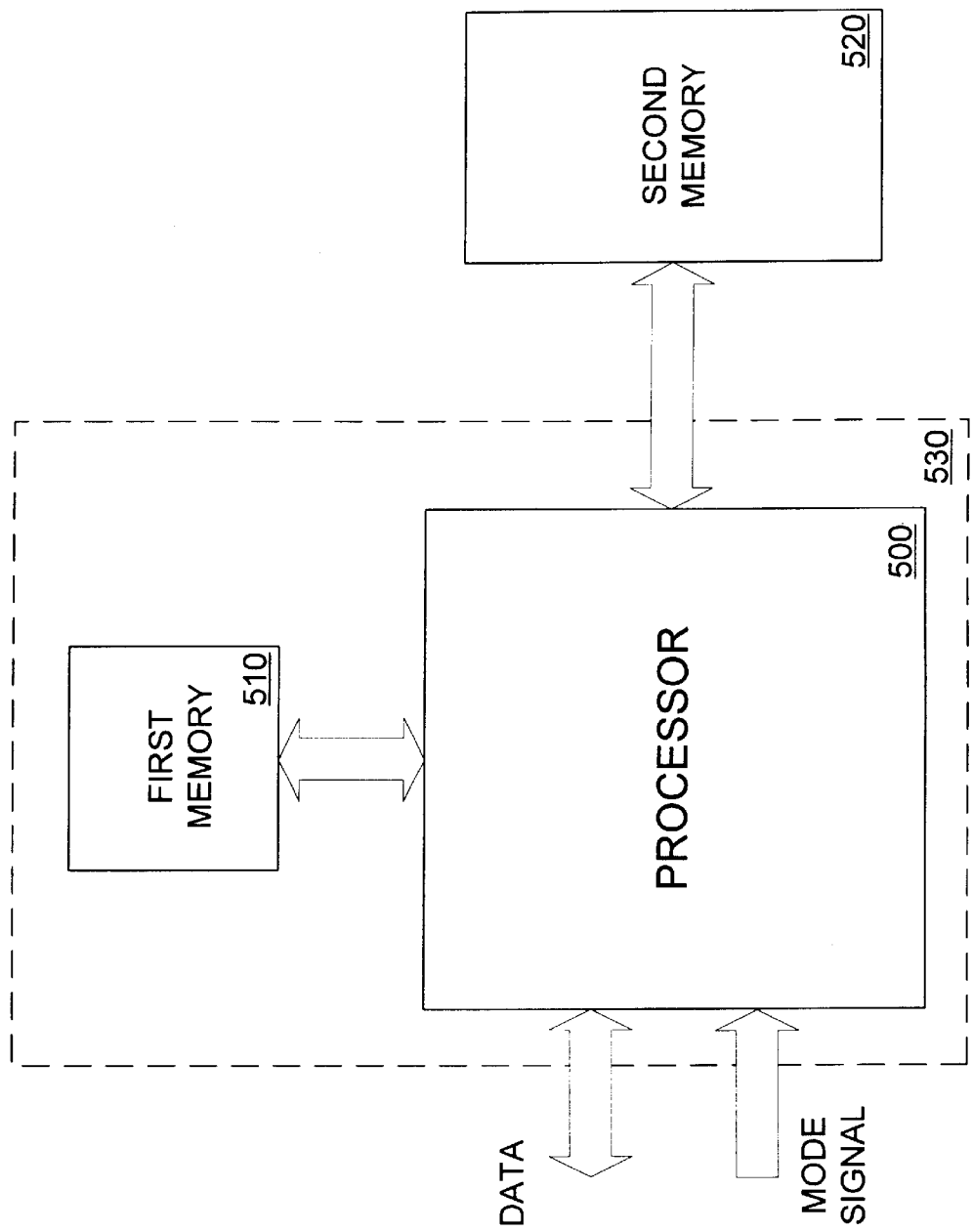
FIG. 5 depicts an apparatus alternative to that of FIG. 1 with which the methods of FIG. 2 through FIG. 4 may be implemented.

FIG. 5 is a second embodiment of the present invention, which includes the processor 500 coupled to a first memory 510 and a second memory 520. In the particular embodiment illustrated, although not so limited, the first memory 510 can be a read only memory (ROM), and the second memory 520 can be a flash memory. Furthermore, although the first memory 510 and the processor 500 are shown as residing in an integrated circuit 530, they can also be implemented in the present invention as discrete components. An example of the integrated circuit 530 comprising a processor 500 and ROM 510 is Advanced Micro Devices' PHoX® integrated circuit.

The embodiment of FIG. 5 is similar to that of FIG. 1, except that the executable code residing in the first region 20a of the memory 20 (see FIG. 1) now resides in the first memory 510, and the data received by the processor 500 is stored in the second memory 520.

Figure 6:
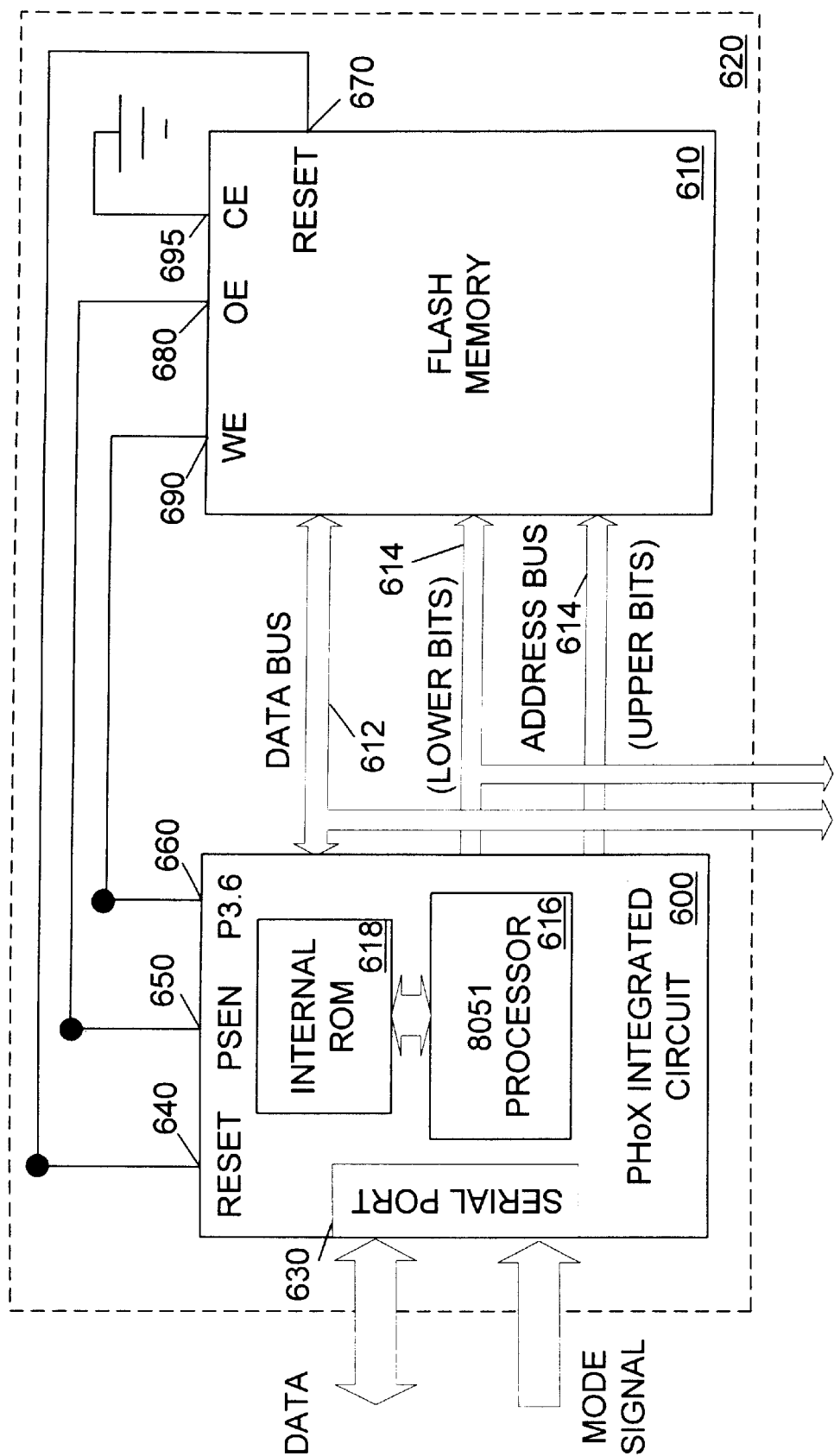
FIG. 6 illustrates a more detailed block diagram of one embodiment of the apparatus alternative of FIG. 5.

FIG. 6 illustrates a more detailed block diagram of one embodiment of the apparatus of FIG. 5, wherein the integrated circuit 530 is a PHoX® integrated circuit 600, and the memory 520 is a flash memory 610. The PHoX® integrated circuit 600 is coupled to the flash memory 610 via a data and address bus 612, 614. The PHoX® integrated circuit 600 includes an 8051 processor 616 coupled to an internal maskable ROM 618. The integrated circuit 600 and the flash memory 610 may be placed on a single multi-chip module 620. Although this particular multi-chip module 620 includes the PHoX® integrated circuit 600 coupled to the flash memory 610, it is envisioned that the present invention can be implemented using other integrated circuits and memories known in the art.

As shown in FIG. 6, the PHoX® integrated circuit 600 includes a serial port 630, a RESET pin 640, a Program Space Enable (PSEN) pin 650, and a P3.6 pin 660. The RESET, PSEN, and P3.6 pins 640, 650, 660 are coupled to RESET, Output Enable (OE), and Write Enable (WE) pins 670, 680, 690, of the flash memory, respectively. A Chip Enable (CE) pin 695 of the flash memory 610 is grounded. The RESET pin 660 is capable of resetting the flash memory 610 to a predefined state. The serial port 630 is adapted to receive data, as well as the first and second mode signal, from an external source (not shown).

During the development mode, the 8051 processor 616 can write to the flash memory 610 by asserting the P3.6 pin 660 of the PHoX® integrated circuit 600. When the P3.6 pin 660 is asserted, the WE pin 690 of the flash memory 610 is enabled, allowing the 8051 processor 616 to write the data to the flash memory 610.

To execute the downloaded software from the flash memory 610 during the execution mode, the 8051 processor 616 accesses the program space of the flash memory 610 by enabling a the PSEN pin 650. Enabling the PSEN pin 650 activates the OE pin 680 of the flash memory 610, thereby making the flash memory 610 accessible to the 8051 processor 616. Once the OE pin 680 is enabled, and an address for a memory access has been asserted on the address bus 614, the flash memory 610 places the data corresponding to the memory access on the data bus 612.

The multi-chip module 620 enables a developer to download the development software to the flash memory 610, and then execute out of the flash memory 610. If an error is found in the development software during the execution mode, the multi-chip module 620 can be utilized once again to reprogram the flash memory 610 and to test the debugged code. The above procedure can be repeated until the development software is error free.

Once the development software is error free, the final version of the software can be programmed into the ROM 510 of the PHoX® integrated circuit 600. The PHoX® integrated circuit 600, which would now include the final software version stored in the ROM 510, can then be implemented in the final product (e.g., cordless phone).

It will be appreciated by those of ordinary skill in the art having the benefit of this disclosure that numerous variations from the foregoing illustration will be possible without departing from the inventive concept described herein. Accordingly, it is the claims set forth below, and not merely the foregoing illustration, which are intended to define the exclusive rights of the invention.

What is claimed:

1. A method, comprising:

providing a first mode signal to a processor to operate in a development mode;

executing instructions stored in a first region of a memory in response to the first mode signal;

providing data to the processor from an external source; and writing the data into a second region of the memory during the development mode.

2. The method of claim 1, wherein the act of writing the data includes writing program instructions into the second region of the memory.

3. The method of claim 1, further comprising:

providing a second mode signal to the processor to operate in an execution mode; and executing the program instructions stored in the second region of the memory.

4. The method of claim 1, wherein the act of providing the first mode signal includes providing the first mode signal to a serial port of the processor.

5. The method of claim 1, wherein the act of providing data includes providing data to a serial port of the processor.

6. The method of claim 1, wherein the act of executing instructions includes operating the processor as an intelligent slave.

7. The method of claim 1, wherein the first region of the memory is a first memory, and wherein the act of executing includes executing from the first memory.

8. The method of claim 1, wherein the second region of the memory is a second memory, and wherein the act of writing includes writing to the second memory.

9. An apparatus, comprising:

a memory having a first region and a second region, the first region of the memory containing executable instructions; and a processor for executing the executable instructions from the first region of the memory to operate in a development mode in response to receiving the first mode signal, wherein the processor writes data from an external source to the second region of the memory during the development mode.

10. The apparatus of claim 9, further including the processor for receiving a second mode signal and executing the executable instructions from the second region.

11. The apparatus of claim 9, wherein the memory comprises a first and second memory and wherein the first region resides in the first memory and the second region resides in the second memory.

12. The apparatus of claim 11, wherein the first memory is a read only memory.

13. The apparatus of claim 11, wherein the second memory is a programmable memory.

14. The apparatus of claim 11, wherein the second memory is a flash memory.

15. A multi-chip module, comprising:
   an integrated circuit, comprising:
      a first memory having executable instructions; and
      a processor for executing the executable instructions from the first memory during a development mode in response to receiving a first mode signal; and
   a second memory coupled to the integrated circuit, the second memory for receiving and storing executable instructions during the development mode under the control of the executable instructions stored in the first memory.

16. The multi-chip module of claim 15, wherein the second memory is a flash memory.

17. The multi-chip module of claim 16, wherein the integrated circuit has a write pin and a read pin coupled to an output enable pin and a write enable pin of the flash memory, respectively.

18. The multi-chip module of claim 15, wherein the processor includes a serial port, and wherein the processor receives the first mode signal through the serial port.

* * * * *